April 16, 1957 G. P. TOEWS 2,788,772
INTERNAL COMBUSTION ENGINES
Filed Sept. 14, 1953

INVENTOR.
Gustav P. Toews.
BY
Thiess, Olson, Mecklenburger,
von Holst, & Coltman. Attys.

United States Patent Office 2,788,772
Patented Apr. 16, 1957

2,788,772

INTERNAL COMBUSTION ENGINES

Gustav P. Toews, Clifton Heights, Pa., assignor to George B. Fowler, Springfield, Mass., as trustee Application September 14, 1953, Serial No. 379,809

5 Claims. (Cl. 123—28)

The present invention relates to improvements in internal combustion engines and their method of operation.

The invention concerns itself primarily with means for avoiding the necessity of cooling an internal combustion engine by means of a liquid coolant, and therefore relates primarily to efficient means for cooling the cylinders of an internal combustion engine, and the utilization of the coolant used, in this case air, so as to obtain a greater heat efficiency of the engine by reason of the return thereto of some of the thermal energy which would otherwise be wasted.

Internal combustion engines, particularly of the type employed for the propulsion of aircraft, are almost always of the air cooled type in which the cylinders are provided with cooling fins for the purpose of preventing the overheating of the engine which would result unless the heat generated by the combustion of the fuel within the cylinders of the engine were sufficiently dissipated.

It is well known that the efficiency of any type of engine is comparatively small by reason of the fact that so much of the heat energy developed is wasted. This has been considered as a more or less unavoidable circumstance.

It is one of the objects of the present invention to provide an internal combustion engine in which no liquid coolant is used and in which the heat is abstracted from the cylinders by the passage of air thereover, which air however is confined to a definite path so that the resultant heated air may be utilized to increase the efficiency of the engine by conducting such air into the intake manifold of the engine in conjunction with a suitable charge of fuel which is introduced into the heated air under positive mechanical pressure.

In view of the fact that the general mechanical construction of internal combustion engines follows more or less standard patterns, it is not deemed necessary to illustrate the various working parts of such an internal combustion engine such as its pistons, crank shafts, valve gear, fuel injection, etc., as these are more or less standardized and of well known construction.

Applicant has already described in a patent previously issued to him, namely No. 2,481,890, an improved internal combustion engine and method of operating the same, in which more than two igniters or spark plugs are employed, thereby obtaining a very greatly improved operation of engines thus constructed.

Applicant has also described in a copending application Serial No. 350,866, filed April 24, 1953, now Patent 2,760,479, issued August 28, 1956, a means and method for converting a more or less standard type of two spark plug internal combustion engine into one having a third spark plug located in a passageway extending laterally from the interior of the cylinder, but originating at a point near to the intake valve.

In accordance with the present invention, however, engines constructed in accordance with applicant's prior patent and the said copending application are further improved particularly as to their thermal efficiency by the expedient of providing an improved induction system which includes surrounding the cylinders, more particularly the heat-dissipating surfaces thereof, such, for instance, as fins, with a jacket or shroud, so constructed as to compel air which is being drawn into the cylinder through its intake valve to be brought directly into contact with said surfaces whereby the cylinder is cooled while at the same time its heat energy is conserved.

The arrangement is such that the heated air thus obtained is employed as a means for providing the desired amount of working fluid within the cylinder of the engine in admixture with an appropriate and predetermined amount of combustible fuel.

Inasmuch as the invention is applicable to all of the cylinders of such an engine, and as the principle is the same for all of the cylinders, only so much of the construction is illustrated in the accompanying drawings as to reveal and disclose the primary inventive concept which underlies the present invention.

Accordingly there is shown in the accompanying drawings, in five figures, one of the cylinders of such an engine with indications as to the method of introducing the fuel.

Inasmuch as the device for introducing the fuel is a standard article of commerce, and is known as a fuel injection system, it need not be described in detail.

Figure 3:
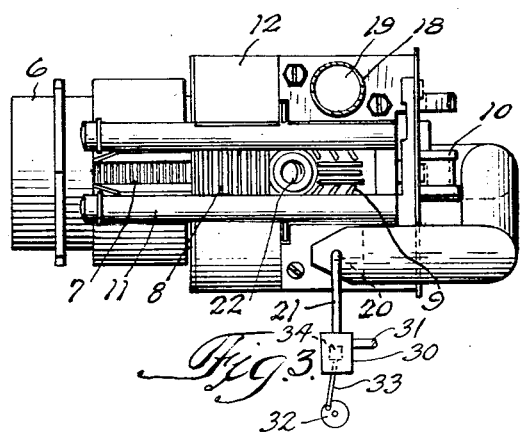
Fig. 3 is a bottom plan view, partly broken away.

Thus the cylinder 6 may be provided with the usual cooling fins 7 and 8 and 9, which are only visible in Fig. 3, as seen from the bottom.

Figure 1:
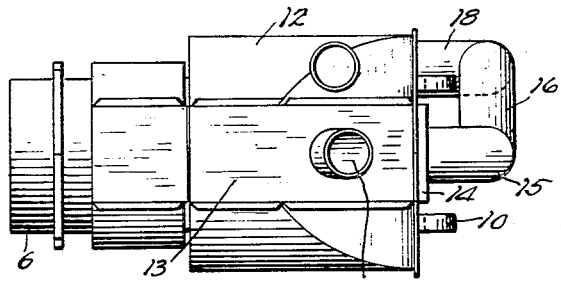
Fig. 1 is a top plan view of one of the cylinders of a horizontally opposed four cylinder engine embodying the principles of the present invention.
Figure 2:
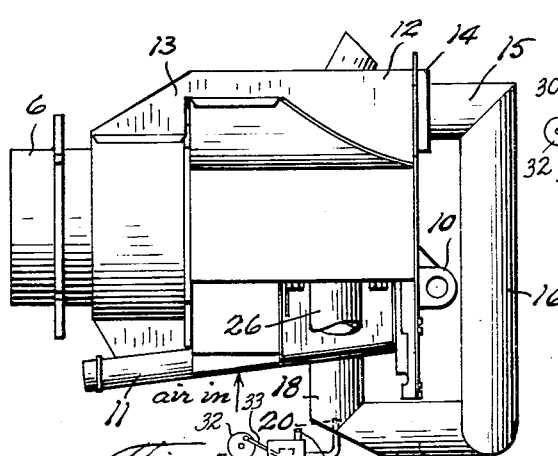
Fig. 2 is a side elevation of the same engine on the same scale.
Figure 5:
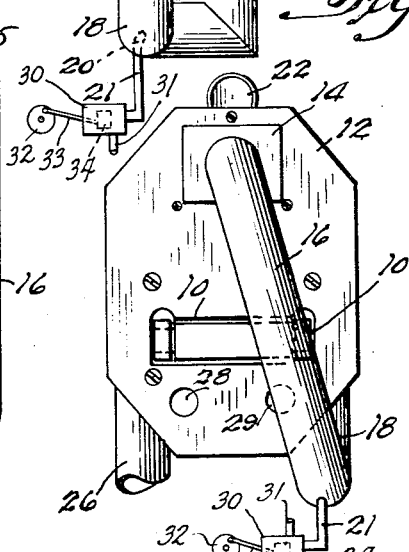
Fig. 5 is a front end view of the cylinder.

The point at which the connecting rod enters the cylinder is at the left of Figs. 1, 2 and 3, and is not shown as it is not necessary for an understanding of the invention. Also merely indicated on the right hand side of the said figures are the supports 10 for the rocker arms which actuate the valves within the engine, there also being shown the tubular sleeves 11 through which the valve actuating rods lead to the valve actuating mechanism which latter has also been omitted for sake of simplicity.

The cylinder is surrounded on substantially all sides by a covering jacket or shroud 12, which is so constructed as closely to surround and practically to touch the aforementioned fins 7, 8 and 9. These jackets are made of a suitable material and may if desired be additionally covered with insulation (not shown).

This jacket is so arranged that the air will enter at the bottom of the engine, that is between the sleeves 11, entering in the direction of the arrow shown at the bottom of Fig. 2. The air thence passes over the fins and through to the other side of the cylinder, eventually passing through the portion 13 of the jacket and issuing at the right hand side as shown in Fig. 2 through an opening to which is attached, by means of a flange 14, an air-conducting pipe 15 which is coextensive with a downwardly directed similar pipe 16 which also has a horizontally extending portion 17 which in turn is secured to an upwardly extending portion 18. The latter enters the intake manifold 19, which leads to the intake valve of the cylinder. At the point where the tubes 17 and 18 meet, preferably an obtuse angle, there is located the fuel intake nozzle 20 which is supplied through a tube 21 coming from a fuel pump 30 which is actuated by means of a piston 34 operated from a crankshaft 32 and connecting rod 33, which supplies the fuel nozzle 20 from a source of supply coming through pipe 31. Suitable spark plug openings 22 are provided, there being one on each side of the cylinder. An exhaust pipe 26 serves to eject the spent gases leaving the cylinder on the scavenger stroke.

Figure 4:
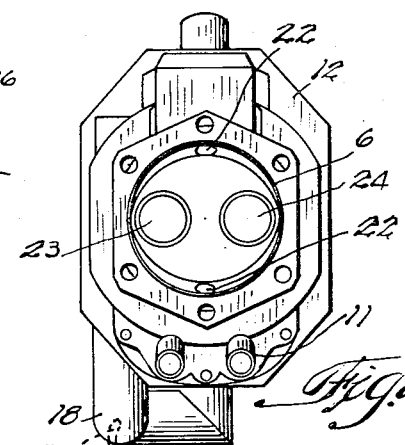
Fig. 4 is a view into the cylinder from the crank case end.

The valves of the engine are seen in Fig. 4, the inlet valve being numbered 23 and the exhaust valve 24, these being of entirely usual construction.

The spark plug opening 22 at the one side of the cylinder is also shown in Fig. 4 and the corresponding directly oppositely positioned second spark plug opening is also shown as 22.

Suitable openings 28 and 29 are provided for passage of the push rods which actuate valve rocker (not shown), these being visible bars or bracket 10.

When the engine is operating, the suction provided by the motion of the piston within the cylinder will draw air through the intake valve 23 and this air will have been heated in its passage over the fins 7, 8 and 9 of the cylinder. Therefore this air will have a fairly high temperature at the time it passes upwardly through the pipe 18, so that when the fuel is injected into this pipe by the injector 20 the fuel will at once be thoroughly mingled with and maintained in suspended condition in the heated air. The engine is thus not only supplied with heated air to produce a better combustible mixture, but also the heat otherwise lost is introduced back into the engine, therefore improving its operation.

Applicant is aware of the fact that the use of air heated by passage over the exhaust manifolds of engines has been directed to the various carburetor systems of internal combustion engines. However, when applying heated air to a carburetor, this leads to a great many difficulties, primarily by its incidental and quite undesirable heating of the liquid fuel so that it will prematurely vaporize or boil. However, by using a fuel injection system, it is possible to take full advantage of the engine cylinder cooling and air heating system, as hereinabove described, to improve the operation of the engine.

The engine as illustrated is preferably provided with a third additional spark plug in accordance with the teaching of applicant's earlier Patent 2,481,890 and particularly by the spark plug adapter construction described in Patent 2,760,479, in order to obtain full utilization of the advantages thereof.

An engine constructed in accordance with the present invention is particularly suitable for airplanes, but it may also be used in automotive vehicles, thereby entirely avoiding the necessity for a liquid coolant so that the engine may be operated at well below the freezing point without danger of the cracking of the cylinders, as would be the case if water were used as the liquid cooling medium.

It will of course be understood that the illustrations shown in the drawings are entirely exemplificative, and that the invention is by no means limited to the exact orientation of the various parts shown provided only that the system is such that the air is drawn positively over the heat-dissipating surfaces of the cylinder and is then substantially in its entirety drawn into the cylinder itself.

These jackets or shrouds may be made of any suitable material, provided only that it will withstand the necessary temperatures and have sufficient inherent strength and rigidity to withstand the operation of the engine.

Accordingly applicant claims:

1. An improved air-cooled internal combustion engine having the usual pistons and cylinders, each of said cylinders having radially extending heat-dissipating fins to cool said cylinders, characterized by the following improvements: a confining jacket surrounding the fins of each cylinder, an intake manifold, means for drawing air through said jacket into said manifold, and means for injecting liquid fuel in atomized form into said manifold, said means comprising an injection nozzle and means for discharging said fuel therefrom under mechanically applied pressure, the entire quantity of heated air being used by reintroduction into the cylinder through said manifold.

2. In an internal combustion engine of the type having a plurality of pistons in air-cooled cylinders provided with heat-dissipating fins, inlet valves and an intake manifold in communication with said inlet valves, the improvement which comprises a jacket about the fins of each cylinder to form therewith and with the outer walls of said cylinders a confined passageway, means for drawing air through said passageway and thence through said manifold into the cylinders of said engine through their corresponding intake valves by the intake strokes of said pistons, and means for spraying combustible fluid into said manifold under applied mechanical pressure, the entire heated air being thus utilized by introduction into said cylinders of said engine through the intake valves.

3. In an internal combustion engine of the type in which the cylinders are provided with intake valves and heat-dissipating fins, the improvement which comprises the combination of an air-intake duct, a jacket substantially surrounding a cylinder of said engine, connection between said jacket and intake duct, an intake manifold connected with said jacket to draw air therefrom and deliver air into the cylinder of said engine through the intake valve thereof from said air-intake duct, jacket and intake manifold; and means for positively injecting fuel under mechanical pressure into said intake manifold at a point in close proximity to the locus of introduction of the air into the cylinder.

4. An improved method of operating an internal combustion engine having an intake valve and heat-dissipating fins on its cylinder which comprises passing air over said fins within an enclosed passageway, drawing the air thus heated into the cylinder and injecting predetermined quantities of fuel into said air by positive mechanical pressure at a point close to said intake valve of said cylinder.

5. In an internal combustion engine of the type employing fuel injection into the intake manifold thereof, the improvement which comprises means for passing a confined current of air over the exterior of each of the cylinders of said engine to heat it and then drawing the thus heated air into the cylinders and means for positively injecting a predetermined modicum of liquid fuel into said manifold.

References Cited in the file of this patent

UNITED STATES PATENTS

| | | |
|---|---|---|
| 866,654 | Jakob | Sept. 24, 1907 |
| 1,189,564 | Harper | July 4, 1916 |
| 1,342,553 | Leinweber | June 8, 1920 |
| 2,302,298 | Cox | Nov. 17, 1942 |
| 2,392,060 | Osborn | Jan. 1, 1946 |
| 2,481,890 | Toews | Sept. 13, 1949 |
| 2,583,018 | Satterlee | Jan. 22, 1952 |

FOREIGN PATENTS

| | | |
|---|---|---|
| 595,406 | France | Oct. 2, 1925 |
| 770,483 | France | July 2, 1934 |
| 874,198 | France | Apr. 20, 1942 |
| 267,689 | Great Britain | Mar. 24, 1927 |